United States Patent [19]

Neuberg et al.

[11] 4,321,341
[45] Mar. 23, 1982

[54] THERMOPLASTIC SEGMENTED ELASTOMERIC COPOLYETHER-ESTERS AND THEIR USE AS PRESSURE-SENSITIVE ADHESIVES

[75] Inventors: Rainer Neuberg, Dannstadt-Schauernheim; Hans G. Matthies, Ludwigshafen; Wolfgang Druschke, Dirmstein, all of Fed. Rep. of Germany

[73] Assignee: BASF Aktiengesellschaft, Ludwigshafen, Fed. Rep. of Germany

[21] Appl. No.: 157,013

[22] Filed: Jun. 6, 1980

[30] Foreign Application Priority Data

Jun. 25, 1979 [DE] Fed. Rep. of Germany ........ 2925582

[51] Int. Cl.³ ............................................ C08G 63/76
[52] U.S. Cl. .................... 525/437; 525/444; 528/296; 528/300; 528/302
[58] Field of Search ................ 525/444, 437; 528/296, 528/300, 302; 260/26

[56] References Cited

U.S. PATENT DOCUMENTS

| | | | |
|---|---|---|---|
| 3,832,314 | 8/1974 | Holt et al. | 260/26 |
| 3,932,326 | 1/1976 | Holt et al. | 260/26 |
| 4,013,624 | 3/1977 | Hoeschele | 528/300 |
| 4,025,694 | 5/1977 | Pletcher et al. | 528/302 X |
| 4,122,073 | 10/1978 | Georgoudis | 528/302 X |
| 4,124,571 | 11/1978 | Georgoudis | 528/302 X |

FOREIGN PATENT DOCUMENTS

| | | |
|---|---|---|
| 1262818 | 2/1972 | United Kingdom . |
| 1323345 | 7/1973 | United Kingdom . |
| 1494685 | 12/1977 | United Kingdom . |

*Primary Examiner*—Lucille M. Phynes
*Attorney, Agent, or Firm*—Oblon, Fisher, Spivak, McClelland & Maier

[57] ABSTRACT

Thermoplastic segmented elastomeric copolyether-esters which substantially consist of a plurality of recurring short-chain and long-chain ester units linked to one another by ester bonds, the proportion of the short-chain ester units of the formula

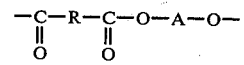

I where R is the divalent radical remaining after removal of the carboxyl groups of aromatic dicarboxylic acids having a molecular weight of <350 and A is the divalent radical remaining after removal of the hydroxyl groups of a diol having a molecular weight of <250, being from 15 to 75% by weight, and the proportion of the long-chain ester units of the formula

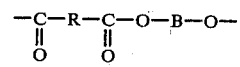

II where R is defined as above and B is the divalent radical remaining after removal of the terminal hydroxyl groups from a long-chain glycol, being from 25 to 85% by weight of the copolyester, and which contain from 0.01 to 5 mole %, based on copolyester, of trifunctional or more highly functional compounds, serving as branching agents, chemically incorporated into the polymer molecule. The copolyesters are particularly suitable for use in pressure-sensitive adhesives.

9 Claims, No Drawings

THERMOPLASTIC SEGMENTED ELASTOMERIC COPOLYETHER-ESTERS AND THEIR USE AS PRESSURE-SENSITIVE ADHESIVES

Copolyesters and specifically segmented copolyether-esters have already been disclosed as hot-melt adhesives and as pressure-sensitive adhesives, for example in U.S. Pat. Nos. 3,832,314 and 3,932,326. Furthermore, copolyether-ester pressure-sensitive adhesives have been described in British Pat. No. 1,494,685.

These copolyether-esters have short-chain and long-chain ester segments.

Whilst in the case of hot-melt adhesives a relatively short "pot life", during which bonding is effected, suffices, products used as pressure-sensitive adhesives must have an indefinite "pot life" (at room temperature), i.e. they must form a permanently tacky film. Hence, such adhesives must exhibit high surface tack coupled with good cohesion, but without an excessively high melt viscosity.

It is true that the prior art copolyester and copolyether-ester pressure-sensitive adhesives exhibit a satisfactory level of adhesion for a few applications, but the cohesion is not fully satisfactory.

It is an object of the present invention to provide pressure-sensitive adhesives having improved properties, in particular improved cohesion.

We have found that this object is achieved by providing thermoplastic, segmented elastomeric copolyether-esters which substantially consist of a plurality of recurring short-chain and long-chain ester units linked to one another by ester bonds, the proportion of the short-chain ester units of the formula

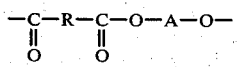   I where R is the divalent radical remaining after removal of the carboxyl groups of aromatic dicarboxylic acids having a molecular weight of <350 and A is the divalent radical remaining after removal of the hydroxyl groups of a diol having a molecular weight of <250, being from 15 to 75% by weight, and the proportion of the long-chain ester units of the formula

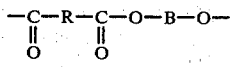   II where R is defined as above and B is the divalent radical remaining after removal of the terminal hydroxyl groups from a long-chain glycol, being from 25 to 85% by weight of the copolyester, which contain from 0.01 to 5 moles%, based on copolyether-ester, of trifunctional or more highly functional compounds, serving as branching agents, chemically incorporated or condensed, into the polymer molecule, and which are particularly suitable for the preparation of pressure-sensitive adhesives.

These novel segmented copolyether-esters give excellent pressure-sensitive adhesives if from 1 to 99% by weight, based on total mixture, of conventional tackifying thermoplastic resins, which form mixtures compatible with the copolyether-ester, are added to the latter, the tackifying resins preferably having low molecular weights, in particular from 500 to 4,000. The molecular weights stated are determined osmometrically by means of a vapor pressure osmometer from Mechrolab.

The preparation of slightly branched or cross-linked polyesters has been disclosed in British Pat. Nos. 1,323,345 and 1,262,818. However, with increasing branching or crosslinking, it becomes more difficult, and ultimately quite impossible, to process these conventional branched or crosslinked polyesters to form fibers, for example by melt spinning and drawing. The concentrations of the crosslinking components are in general less than 1 mole%. The fibers and filaments thus produced have found use in the low-pilling textile sector, specifically because of their poorer properties (such as lower tenacity and lower flexural strength). The incorporation of these branch points results in a broadening of the molecular weight distribution, leading to lower strength, and to embrittlement and hardening.

The use of comonomers, having a branching action, in the copolyether-esters of the present invention on the other hand, surprisingly, does not cause brittleness or hardness; rather, it is very effective in increasing the cohesion and the adhesion.

To prepare the copolyether-esters, it is possible to use aromatic, aliphatic or cycloaliphatic dicarboxylic acids of low molecular weight, which contain various substituents which do not interfere with the polycondensation reaction. Suitable aromatic dicarboxylic acids are, in particular, terephthalic acid, isophthalic acid and phthalic acid, as well as 2,6-naphthalenedicarboxylic acid. Hydroxy-acids, e.g. p-hydroxybenzoic acid, may be used additionally, if an aromatic dicarboxylic acid is also employed. Suitable aliphatic and cycloaliphatic dicarboxylic acids are, in particular, adipic acid, sebacic acid and 1,4-cyclohexanedicarboxylic acid. The dicarboxylic acids are in general of 4 to 12 carbon atoms.

Suitable diols having a molecular weight of less than 250, or their ester-forming derivatives, for providing the hard segments of the copolyether-esters are those which react with formation of short-chain ester units, for example aliphatic, alicyclic and aromatic dihydroxy compounds which are preferably of 2 to 15 carbon atoms, e.g. ethylene glycol, propylene glycol, tetramethylene glycol, hexamethylene glycol, decamethylene glycol, cyclohexanedimethanol and hydroquinone. Bisphenols, e.g. 2,2'-bis-(p-hydroxyphenyl)-propane and bis-4,4'-(hydroxyphenyl)-sulfone, may also be used as diols.

Examples of suitable long-chain glycols which may be used to provide the soft segments of the copolyether-esters are poly-(alkylene ether) glycols, e.g. poly-(ethylene ether) glycols and poly-(tetramethylene ether) glycol. The molecular weights of these long-chain glycols are in general from 400 to 6,000.

The comonomers, or ester-forming derivatives thereof, which have a branching or crosslinking action and which are used to prepare the novel polyesters, possess three or more, in general up to ten, functional groups capable of forming ester bonds. Preferred comonomers having a branching or crosslinking action possess from 3 to 6 functional groups of this type per molecule, in particular from 3 to 6 hydroxyl groups, carboxyl groups and/or carboxymethyl groups. Examples of suitable trifunctional or more highly functional compounds which can form ester bonds are trimethylolpropane, trimethylolethane, pentaerythritol, polyether-triols, glycerol, trimesic acid, trimellitic acid, pyromellitic acid and hydroxyisophthalic acid. Liquid polyacrylates, referred to as polyacrylate-ols, which possess not less than one, but in most cases from 3 to 10, especially from 3 to 6, hydroxyl groups, such as are described in British Pat. No. 1,469,682, may also be used with advantage. Such liquid acrylic ester copolymers (i.e. polyacrylate-ols) contain (a) from 55 to 97% by weight of acrylic acid esters of non-tertiary alkanols of 3 to 12 carbon atoms, (b) from 20 to 25% by weight of alkyl acrylates and/or alkyl methacrylates containing one or more hydroxyl groups and (c) from 0 to 20% by weight of other monoolefinically unsaturated monomers, as copolymerized units, and have a means molecular weight of from 1,000 to 10,000, preferably from 2,000 to 5,000, and a pour point of below 15° C., in most cases of from −15° to +15° C., the molecular weights being determined in acetone, using the Mechrolab vapor pressure osmometer, and the pour point being determined according to ASTM-D 97-57. Functional compounds of this type, i.e. branching or crosslinking comonomers, which are of particular interest are alkanols having from 3 to 6 hydroxyl groups per molecule, including liquid polyacrylate-ols with this number of hydroxyl groups.

In the preparation of the segmented polyether-esters, the branching or crosslinking comonomers are preferably introduced into the process sequence at the earliest possible stage, for example during the transesterification. It is also possible to add the branching and/or crosslinking comonomer during an early stage of the polycondensation reaction. Where the branching and-/or crosslinking agent boils below 200° C., a proportion of it may distil from the polycondensation mixture before the reaction. It is preferred to add the branching or crosslinking agent at an earlier stage of the process, in order to avoid this complication and to ensure that this compound is distributed as uniformly as possible within the polycondensate.

Copolyether-esters which are prepared from 35–95, preferably 45–75, mole% of terephthalic acid, 5–65, preferably 25–55, mole% of isophthalic acid and/or adipic acid, 15–99.8, preferably 40–99, mole% of butane-1,4-diol and 0.2–85, preferably 1–60, mole% of polytetramethylene ether glycol having a molecular weight of from 600 to 3,000, and 0.01–5, preferably 0.5–2.5, mole% of a branching or crosslinking agent, e.g. trimethylolpropane or a liquid polyacrylate-ol having 1 or 2 hydroxyl groups per molecule, are particularly preferred.

The novel copolyether-esters can be prepared by conventional polycondensation methods under the conventional temperature and pressure conditions for such methods.

In a preferred process, a mixture of dimethyl terephthalate and dimethyl isophthalate with polytetramethylene ether glycol and excess butanediol is heated in the presence of a catalyst at 150°–260° C. and the methanol formed by trans-esterification is distilled off. Heating is continued until the evolution of methanol has ceased. Depending on the temperature, the catalyst and the excess of diol used, the polycondensation is complete after a period ranging from several minutes to several hours. The process results in the formation of a prepolymer of low molecular weight which can be converted to the high molecular weight segmented copolyester according to the invention.

The prepolymer is then converted to the high molecular weight segmented elastomeric copolyether-ester by distilling off the excess butanediol. The best results are usually achieved if this last process stage, i.e. the distillation, is carried out at a pressure below 1.33 mbar, and at from 240° to 260° C., in the course of less than 2 hours.

The conventional catalysts can be used for the polycondensation; preferably, esters of titanic acid with alkanols of 4 to 20 carbon atoms, e.g. tetrabutyl titanate, are used either alone or in combination with magnesium acetate or zinc acetate.

It is at times advantageous to stabilize the copolyether-esters against the action of heat and ultraviolet light. Examples of suitable conventional stabilizers and/or oxidation retarders for this purpose are phenols and their derivatives, amines and their derivatives, ureas and their derivatives, barbiturates, compounds which contain both hydroxyl and amino groups, hydroxyamines, oximes, polymeric phenol-esters, salts of polyvalent metals in which the metal is in its lower valency state, and phosphites.

Examples of phenol stabilizers are hydroquinone, 2,6-di-tert.-butyl-p-cresol, tetrakis-(methylene-3-(3′,5′-di-tert.-butyl-4′-hydroxyphenyl)-propionate)-methane, 4,4′-bis-(2,6-di-tert.-butylphenol), 1,3,5-trimethyl-2,4,6-tris-(3,5-di-tert.-butyl - 4 - hydroxybenzyl - benzene), 4,4′-butylidene-bis-(6-tert.-butyl-n-cresol) and 4,4-thio-bis-(6-tert.-butyl-meta-cresol).

Typical amines suitable as stabilizers are aromatic amines, e.g. N,N′-bis-(β-naphthyl)-p-phenylenediamine, N,N′-bis-(1-methylheptyl)-p-phenylenediamine and phenyl-β-naphthylamine.

Examples of suitable ureas are N,N′-dimethylurea, N,N′-diphenylurea and N,N′-diphenylthiourea.

Even used by themselves, the novel segmented copolyether-esters are excellent pressure-sensitive adhesives, whose advantageous properties are however improved further by the presence of thermoplastic resins, especially of low molecular weight, which are compatible with the copolyether-esters. The copolyether-esters are heat-stable up to not less than 150° C. and have melt viscosities (measured according to ASTM D 1824-66, using a Brookfield viscometer) of less than about 10,000 cp at 200° C. Suitable tackifying thermoplastic resins are natural resins, modified natural resins and synthetic resins. These are solid, amorphous, hard to brittle, thermoplastic substances which soften at from 40° C. to 140° C., preferably from 75° C. to 125° C., as measured by a ring and ball apparatus according to ASTM E 28-67, in general have a molecular weight or mean molecular weight of from 200 to 7,000, preferably from 500 to 4,000, and possess a melt viscosity of less than about 10,000 mPa.s at 200° C.

Preferably, the resins which contain very few acid groups and have an acid number of less than 100, preferably of from 0 to 70, are employed.

Examples of such tackifying resins are terpene resins (also referred to as polyterpene resins), balsam resins, rosins, hydrogenated rosin and esters of rosin or of hydrogenated rosin (as obtainable, for example, from Hercules Chemical Company), esters of hydroxyabietyl alcohol, aromatic hydrocarbon resins, including styrene polymers and copolymers (for example the low molecular weight polystyrene resins available from Hercules Chemical Co. under the trademarks ®Piccolastic and ®Kristalex resins) and α-methylstyrene/vinyltoluene resins (®Piccotex from Hercules Chemical Co.), coumaroneindene resins (for example ®Picco N from Neville Chemical Co.), aromatic-aliphatic copolymer resins (for example ®Carbigen from BASF), aromatic petroleum oils (for example ®Shellflex from Shell Chemical Co.), phenol-modified resins, ketone resins and aldehyde resins.

Other suitable additives are plasticizers, e.g. dioctyl phthalate, pigments, e.g. calcium carbonate, silica, titanium dioxide and zinc oxide, modifiers, e.g. styrene/butadiene copolymers, styrene/isoprene copolymers, ethylene/vinyl acetate copolymers, ethylene/acrylate copolymers and polyacrylates, inert fillers, e.g. barium sulfate, and compounds which accelerate the formation of the adhesive bond, e.g. hydrogenated castor oil (sold under the trade mark Castor Wax by Baker Castrol Oil Co.).

The adhesive properties of sheet-like substrates coated with the novel polyether-ester pressure-sensitive adhesives can be assessed by measuring the shear strength, as a measure of the cohesion, and the peel strength, as a composite measure of the cohesion and surface tack. To carry out the test, polyethylene glycol terephthalate films are coated with a layer 25 μm thick. The coated film is cut into 2 cm wide strips which are applied to a chromed brass plate. The plate bearing the strips is then stored for 24 hours at 23° C. and 65% relative atmospheric humidity.

When measuring the peel strength, the test strips are pulled off parallel to the adhesive layer at an angle of 180° and at a speed of 300 mm/min. The force required is measured.

When measuring the shear strength, a glued surface of size 20×25 mm is cut out, the plate is clamped vertically and the overhanging part of the adhesive strip is subjected to a load of 1 kg. The time required to break the adhesive bond is measured, at 23° C. and at 50° C. All determinations are carried out in triplicate.

The Examples which follow illustrate the advantages of the novel polyether-esters and of their mixtures. Parts are by weight and bear the same relation to parts by volume as that of the kilogram to the liter.

The relative viscosity is determined in solution in a 3:2 (by weight) mixture of phenol and o-dichlorobenzene.

COMPARATIVE EXPERIMENT A

A copolyether-ester is prepared from
105 parts of dimethyl terephthalate
45 parts of dimethyl isophthalate
104 parts of butane-1,4-diol
150 parts of polytetramethylene ether glycol (molecular weight=2,000) and
0.15 part of tetrabutyl orthotitanate.

Using the conventional methods of transesterification and polycondensation, a copolyether-ester having a relative viscosity $\eta_{rel}=1.910$ is obtained. 1% by weight, based on the copolyether-ester, of 2,4,6-di-tert.-butyl-p-cresol (=stabilizer A) is added, as the stabilizer, after the polycondensation.

After completion of the polycondensation, 200 parts of a commercial terpene/phenol resin (®Alresen PK 500 from Reichold-Albert-Chemie AG, softening point about 130° C. measured by the ring and ball method according to ASTM E 28-67, acid number 50–65 measured according to DIN 53,183) are added to the copolyether-ester melt and mixed in until a homogeneous solution results.

The mixture at this stage has a relative viscosity of $\eta_{rel}=1.374$.

The bond strengths achieved using this mixture as a pressure-sensitive adhesive are shown in Table 1.

EXAMPLE 1

A copolyether-ester is prepared from
105 parts of dimethyl terephthalate
45 parts of dimethyl isophthalate
104 parts of butane-1,4-diol
150 parts of polytetramethylene ether glycol (molecular weight=2,000)
13.4 parts of trimethylolpropane and
0.15 part of tetrabutyl orthotitanate.

Using the conventional methods of transesterification and polycondensation, a copolyether-ester having a relative viscosity $\eta_{rel}=2.310$ is obtained. 1% by weight, based on the polyether-ester, of stabilizer A is added after polycondensation.

After completion of the polycondensation, 200 parts of the terpene/phenol resin ®Alresen PK 500 are added to the copolyether-ester melt and mixed in until a homogeneous solution is obtained.

The mixture at this stage has a relative viscosity $\eta_{rel}=1.566$.

The bond strengths achieved using this mixture as a pressure-sensitive adhesive are shown in Table 1.

EXAMPLE 2

A copolyether-ester is prepared from
105 parts of dimethyl terephthalate
45 parts of dimethyl isophthalate
104 parts of butane-1,4-diol
150 parts of polytetramethylene ether glycol (molecular weight=2,000)
10 parts of glycerol and
0.15 part of tetrabutyl orthotitanate.

Using the conventional methods of transesterification and polycondensation, a copolyether-ester having a relative viscosity $\eta_{rel}=2.408$ is obtained. 1% by weight, based on the polyether-ester, of stabilizer A is added after polycondensation.

After completion of the polycondensation, 200 parts of the terpene/phenol resin ®Alresen PK 500 are added to the copolyether-ester melt and mixed in until a homogeneous solution is obtained.

The mixture at this stage has a relative viscosity $\eta_{rel}=1.550$.

The bond strengths achieved using this mixture as a pressure-sensitive adhesive are shown in Table 1.

EXAMPLE 3

A copolyether-ester is prepared from
105 parts of dimethyl terephthalate
45 parts of dimethyl isophthalate
104 parts of butane-1,4-diol
150 parts of polytetramethylene ether glycol (molecular weight=2,000)
40 parts of a liquid polyacrylate-ol prepared according to Example 2 of British Pat. No. 1,469,682 and
0.15 part of tetrabutyl orthotitanate.

Using the conventional methods of transesterification and polycondensation, a copolyether-ester having a relative viscosity $\eta_{rel}=2.280$ is obtained. 1% by weight, based on the polyether-ester, of stabilizer A is added after polycondensation.

After completion of the polycondensation, 200 parts of the terpene/phenol resin ®Alresen PK 500 are added to the copolyether-ester melt and mixed in until a homogeneous solution is obtained.

The mixture at this stage has a relative viscosity $\eta_{rel}=1.534$.

The bond strengths achieved using this mixture as a pressure-sensitive adhesive are shown in Table 1.

EXAMPLE 4

A copolyether-ester is prepared from
105 parts of dimethyl terephthalate
45 parts of dimethyl isophthalate
104 parts of butane-1,4-diol
150 parts of polytetramethylene ether glycol (molecular weight 2,000)
25.4 parts of 1,2,4,5-benzenetetracarboxylic acid (=pyromellitic acid) and
0.15 part of tetrabutyl orthotitanate.

Using the conventional methods of transesterification and polycondensation, a copolyether-ester having a relative viscosity $\eta_{rel} = 2.276$ is obtained. 1% by weight, based on the copolyether-ester, of stabilizer A is added after polycondensation.

After completion of the polycondensation, 200 parts of the terpene/phenol resin ®ALRESEN PK 500 are added to the copolyether-ester melt and mixed in until a homogeneous solution is obtained.

The mixture at this stage has a relative viscosity $\eta_{rel} = 1.506$.

The bond strengths achieved using this mixture as a pressure-sensitive adhesive are shown in Table 1.

EXAMPLE 5

A copolyether-ester is prepared from
105 parts of dimethyl terephthalate
45 parts of dimethyl isophthalate
104 parts of butane-1,4-diol
150 parts of polytetramethylene ether glycol (molecular weight = 2,000)
21.0 parts of 1,2,4-benzenetricarboxylic acid (=trimellitic acid) and
0.15 part of tetrabutyl orthotitanate.

Using the conventional methods of transesterification and polycondensation, a copolyether-ester having a relative viscosity $\eta_{rel} = 2.305$ is obtained. 1% by weight, based on the copolyether-ester, of stabilizer A is added after polycondensation.

After completion of the polycondensation, 200 parts of the terpene/phenol resin ®ALRESEN PK 500 are added to the copolyether-ester melt and mixed in until a homogeneous solution is obtained.

The mixture at this stage has a relative viscosity $\eta_{rel} = 1.490$.

The bond strengths achieved using this mixture as a pressure-sensitive adhesive are shown in Table 1.

EXAMPLE 6

A copolyether-ester is prepared from
105 parts of dimethyl terephthalate
45 parts of dimethyl isophthalate
104 parts of butane-1,4-diol
150 parts of polytetramethylene ether glycol (molecular weight = 2,000)
18.2 parts of hydroxyisophthalic acid and
0.15 part of tetrabutyl orthotitanate.

Using the conventional methods of transesterification and polycondensation, a copolyether-ester having a relative viscosity $\eta_{rel} = 2.295$ is obtained. 1% by weight, based on the copolyether-ester, of stabilizer A is added after polycondensation.

After completion of the polycondensation, 200 parts of the terpene/phenol resin ®ALRESEN PK 500 are added to the copolyether-ester melt and mixed in until a homogeneous solution is obtained.

The mixture at this stage has a relative viscosity $\eta_{rel} = 1.553$.

The bond strengths achieved using this mixture as a pressure-sensitive adhesive are shown in Table 1.

EXAMPLE 7

A copolyether-ester is prepared from
105 parts of dimethyl terephthalate
45 parts of dimethyl isophthalate
104 parts of butane-1,4-diol
150 parts of polytetramethylene ether glycol (molecular weight = 2,000)
13.6 parts of pentaerythritol and
0.15 parts of tetrabutyl orthotitanate.

Using the conventional methods of transesterification and polycondensation, a copolyether-ester having a relative viscosity $\eta_{rel} = 2.352$ is obtained. 1% by weight, based on the copolyether-ester, of stabilizer A is added after polycondensation.

After completion of the polycondensation, 200 parts of the terpene/phenol resin ®ALRESEN PK 500 are added to the copolyether-ester melt and mixed in until a homogeneous solution is obtained.

The mixture at this stage has a relative viscosity $\eta_{rel} = 1.562$.

The bond strengths achieved using this mixture as a pressure-sensitive adhesive are shown in Table 1.

EXAMPLE 8

A copolyether-ester is prepared from
105 parts of dimethyl terephthalate
45 parts of dimethyl isophthalate
104 parts of butane-1,4-diol
150 parts of polytetramethylene ether glycol (molecular weight = 2,000)
12.0 parts of trimethylolethane and
0.15 part of tetrabutyl orthotitanate.

Using the conventional methods of transesterification and polycondensation, a copolyether-ester having a relative viscosity $\eta_{rel} = 2.326$ is obtained. 1% by weight, based on the copolyether-ester, of stabilizer A is added after polycondensation.

After completion of the polycondensation, 200 parts of the terpene/phenol resin ®ALRESEN PK 500 are added to the copolyether-ester melt and mixed in until a homogeneous solution is obtained.

The mixture at this stage has a relative viscosity $\eta_{rel} = 1.534$.

The bond strengths achieved using this mixture as a pressure-sensitive adhesive are shown in Table 1.

COMPARATIVE EXPERIMENT B

A copolyether-ester is prepared from
136 parts of dimethyl terephthalate
52 parts of dimethyl adipate
135 parts of butane-1,4-diol
282 parts of polytetramethylene ether glycol (molecular weight = 2,000) and
0.15 part of tetrabutyl orthotitanate.

Using the conventional methods of transesterification and polycondensation, a copolyether-ester having a relative viscosity $\eta_{rel} = 1.746$ is obtained. 1% by weight, based on the polyether-ester, of stabilizer A is added after polycondensation.

After completion of the polycondensation, 310 parts of a commercial rosin ester (®Foral 85 from Hercules Powder Company, a glycerol ester of hydrogenated rosin, softening point about 75° C. measured by the ring and ball method according to ASTM E 28-67, acid number 9) are added to the copolyether-ester melt and mixed in until a homogeneous solution is obtained.

The mixture at this stage has a relative viscosity $\eta_{rel}=1.368$.

The bond strengths achieved using this mixture as a pressure-sensitive adhesive are shown in Table 1.

EXAMPLE 9

A copolyether-ester is prepared from
136 parts of dimethyl terephthalate
52 parts of dimethyl adipate
135 parts of butane-1,4-diol
20 parts of trimethylolpropane
282 parts of polytetramethylene ether glycol (molecular weight=2,000) and
0.15 part of tetrabutyl orthotitanate.

Using the conventional methods of transesterification and polycondensation, a copolyether-ester having a relative viscosity $\eta_{rel}=2.312$ is obtained. 1% by weight, based on the polyether-ester, of stabilizer A is added after polycondensation.

After completion of the polycondensation, 310 parts of the rosin ester ®Foral 85 are added to the copolyether-ester melt and mixed in until a homogeneous solution is obtained.

The mixture at this stage has a relative viscosity $\eta_{rel}=1.548$.

The bond strengths achieved using this mixture as a pressure-sensitive adhesive are shown in Table 1.

EXAMPLE 10

A copolyether-ester is prepared from
136 parts of dimethyl terephthalate
52 parts of dimethyl adipate
135 parts of butane-1,4-diol
40 parts of polyacrylate-ol, having 3 hydroxyl groups per molecule, prepared according to Example 2 of British Pat. No. 1,469,682
282 parts of polytetramethylene ether glycol (molecular weight=2,000) and
0.15 part of tetrabutyl orthotitanate.

Using the conventional methods of transesterification and polycondensation, a copolyether-ester having a relative viscosity $\eta_{rel}=2.236$ is obtained. 1% by weight, based on the polyether-ester, of stabilizer A is added after polycondensation.

After completion of the polycondensation, 310 parts of the rosin ester ®Foral 85 are added to the copolyether-ester melt and mixed in until a homogeneous solution is obtained.

The mixture at this stage has a relative viscosity $\eta_{rel}=1.552$.

The bond strengths achieved using this mixture as a pressure-sensitive adhesive are shown in Table 1.

TABLE 1

Peel strengths and shear strengths of the polyether-esters of Comparative Experiments A and B of Examples 1 to 10, mixed with commercial tackifier resins

| Mixture of | Peel Strength at 180° C. N/2 cm | Shear strength, 5 cm² | |
|---|---|---|---|
| | | 1,000 g, 23° C. | 1,000 g, 50° C. |
| Comparative Experiment A | 14.9 C. | 8 h 12 min. C. | 37 min C. |
| Example 1 | 34.5 C. | >24 h | 3 h 7 min C. |
| Example 2 | 28.7 C. | >24 h | 2 h 25 min C. |
| Example 3 | 29.6 C. | >24 h | 2 h 55 min C. |
| Example 4 | 27.8 C. | >24 h | 2 h 5 min |
| Example 5 | 25.3 C. | >24 h | 1 h 40 min |
| Example 6 | 28.5 C. | >24 h | 2 h 20 min |
| Example 7 | 26.9 C. | >24 h | 1 h 50 min |
| Example 8 | 32.2 C. | >24 h | 2 h 10 min |
| Comparative Experiment B | 15.3 C. | 16 h 20 min C. | 58 min C. |
| Example 9 | 23.8 C. | 20 h 10 min C. | 1 h 18 min C. |
| Example 10 | 24.7 C. | 19 h 15 min C. | 57 min C. |

C = cohesion failure

We claim:

1. Thermoplastic segmented elastomeric copolyether-esters which substantially consist of a plurality of recurring short-chain and long-chain ester units linked to one another by ester bonds, the proportion of the short-chain ester units of the formula

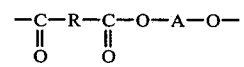

where R is the divalent radical remaining after removal of the carboxyl groups of aromatic dicarboxylic acids having a molecular weight of <350 and A is the divalent radical remaining after removal of the hydroxyl groups of a diol having a molecular weight of <250, being from 15 to 75% by weight, and the proportion of the long-chain ester units of the formula

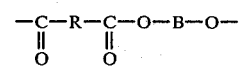

where R is defined as above and B is the divalent radical remaining after removal of the terminal hydroxyl groups from a long-chain glycol, being from 25 to 85% by weight of the copolyester, and which contain from 0.01 to 5 mole%, based on copolyester, of trifunctional or more highly functional compounds, serving as branching agents, chemically condensed into the polymer molecule.

2. Copolyether-esters as claimed in claim 1, wherein the at least trifunctional compound present as co-condensed units is an alkanol, or liquid polyacrylate-ol, containing from 3 to 6 hydroxyl groups per molecule.

3. The copolyether-ester of claim 1, wherein said copolyether-ester is prepared from 35 to 95 mole % terephthalic acid; 5 to 65 mole % isophthalic acid, adipic acid, or a mixture of isophthalic acid and adipic acid; 15 to 99.8 mole % butane-1,4-diol; 0.2 to 85% polytetramethylene ether glycol having a molecular weight from 600 to 3000; and 0.01 to 5 mole % of a branching or crosslinking agent.

4. The copolyether-ester of claim 1, wherein said copolyether-ester is prepared from 45 to 75 mole % terephthalic acid; 25 to 55 mole % isophthalic acid, adipic acid, or a mixture of isophthalic acid and adipic acid; 40 to 99 mole % butane-1,4-diol; 1 to 60 mole % polytetramethylene ether glycol having a molecular weight of from 600 to 3000; and 0.5 to 2.5 mole % of a branching or crosslinking agent.

5. The copolyether-ester of either claim 3 or claim 4, wherein said branching or crosslinking agent is trimethylolpropane or a liquid polyacrylate-ol having 1 or 2 hydroxyl groups per molecule.

6. An adhesive composition comprising the copolyether-ester of claim 1 and compatible tackifying thermoplastic resin.

7. The adhesive composition of claim 6, wherein said thermoplastic resin has a softening point of 40° C. to 140° C., a molecular weight or mean molecular weight of 500 to 4000, and a melt viscosity of less than about 10,000 mPa at 200° C.

8. The adhesive composition of claim 6, wherein said thermoplastic resin has a softening point of 75° C. to 125° C., and a molecular weight or mean molecular weight of 500 to 4000.

9. The adhesive composition of claim 6, wherein said thermoplastic resin has an acid number less than 100.

* * * * *